United States Patent [19]

Hansen

[11] Patent Number: 4,672,617
[45] Date of Patent: Jun. 9, 1987

[54] LASERS

[75] Inventor: Derek Hansen, Glasgow, Scotland

[73] Assignee: Barr & Stroud Limited, Glasgow, Scotland

[21] Appl. No.: 863,669

[22] Filed: May 15, 1986

[30] Foreign Application Priority Data

May 17, 1985 [GB] United Kingdom ............. 8512571

[51] Int. Cl.⁴ .................................................. H10S 3/10
[52] U.S. Cl. .......................................... 372/23; 372/68; 372/54; 372/92
[58] Field of Search ................. 372/23, 92, 54, 68, 372/97

[56] References Cited

U.S. PATENT DOCUMENTS 3,725,810  4/1973  Ashkin et al. .................. 372/54
3,793,541  2/1974  Ashkin et al. .................. 372/54
3,832,649  8/1974  Felchtner ........................ 372/54

Primary Examiner—Léon Scott, Jr.
Attorney, Agent, or Firm—Pennie & Edmonds

[57] ABSTRACT

A multiple wavelength operating laser (10) having a pump cavity or enclosure (14) surrounded by an optical pumping arrangement (17) comprises a plurality of substantially concentric tubes (21A, 21B) each having windows for emission of radiation and enclosing respective bodies of liquid lasing media. The lasing media may be flowed through the respective tubes and are preferentially arranged so that the fluorescence spectra of the lasing medium in one tube overlaps the absorption spectra of the lasing medium in the adjoining tube so that the one lasing medium optically pumps the other lasing medium in addition to optical pumping from the optical pumping arrangement (17).

8 Claims, 10 Drawing Figures

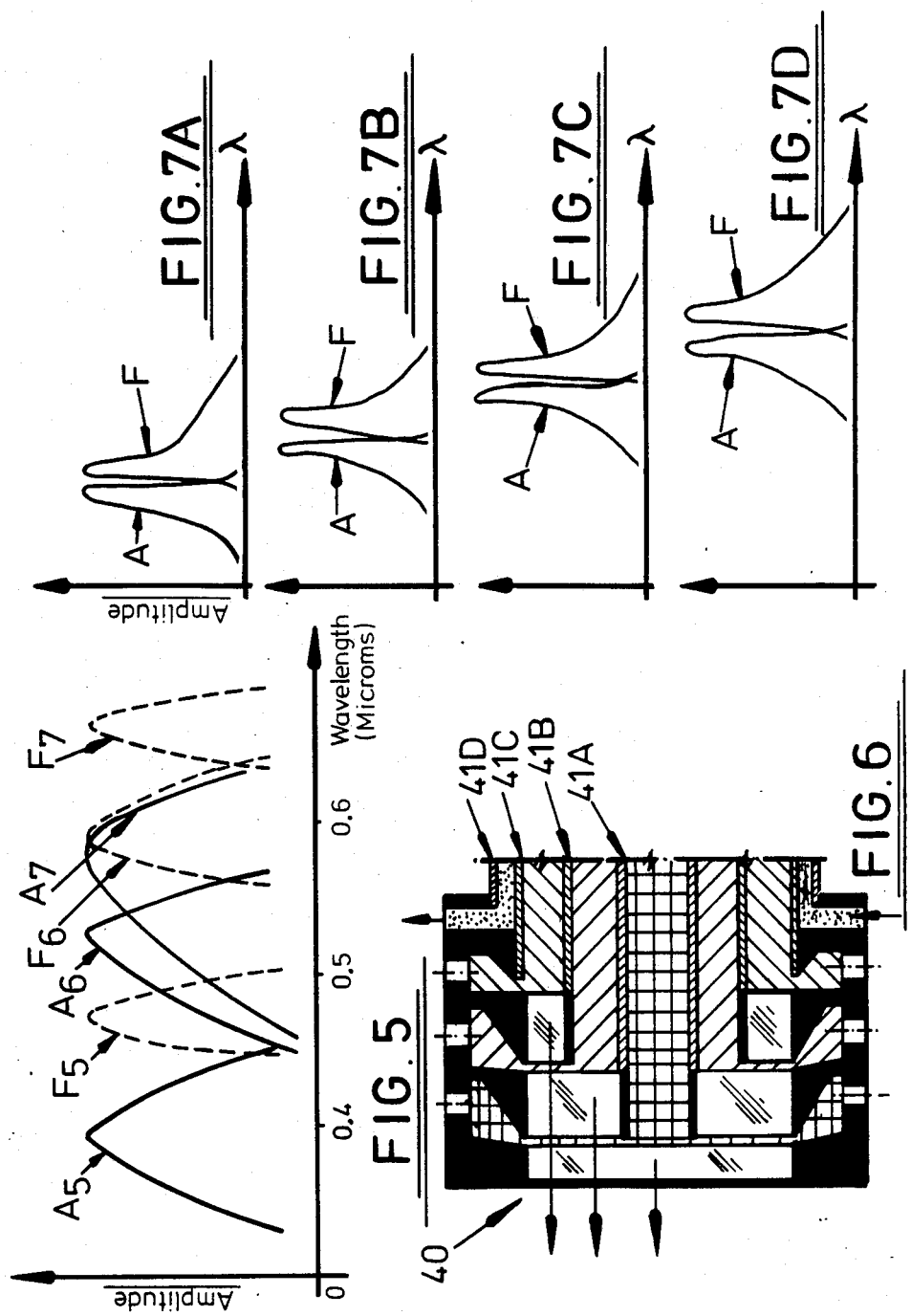

LASERS

This invention relates to lasers, more particularly to multiple-wavelength-operating lasers.

Various forms of multiple-wavelength-operating lasers are already known where a plurality of lasing media are housed in a single pump enclosure, but these lasers are physically bulky, and complex to manufacture and assemble, and provide different optical paths for each wavelength output.

It is an object of the present invention to provide an improved form of multiple-wavelength-operating laser.

According to the present invention a multiple-wavelength-operating laser comprises a pump enclosure having a plurality of substantially concentric tubes extending axially within the laser cavity and surrounded by optical pumping means, each tube containing a respective liquid lasing medium, the ends of each tube including a window for transmitting laser wavelengths and the walls of each tube being transmissive to wavelengths emanating from the optical pumping means.

Preferably the ends of each tube further include passage means for enabling flow of the liquid lasing media into and out of the respective tubes.

Preferably the lasing media from radially outermost to radially innermost are ordered with successively decreasing lasing wavelengths and with successively decreasing absorption spectra. Conveniently the fluorescence emission of a radially inner lasing medium overlaps the absorption spectrum of the adjoining radially outer lasing medium. Alternatively the lasing media are ordered from radially outermost to radially innermost with successively increasing lasing wavelengths and absorption spectra.

Conveniently the optical pumping means comprises a single annular flashlamp. Alternatively the optical pumping means may comprise a plurality of elongate flashlamps encircling the tubes. Various other forms of optical pumping means may be provided, such as vortex stabilised arc lamps. Such pumping means essentially provide a radiation spectrum of the black body type.

By virtue of the present invention a multiple-wavelength-operating laser is provided which is of compact design and relatively simple to engineer. Where the lasing media are flowed through the tubes separate circulation systems may be provided in a manner known per se to avoid contamination. Also, by careful selection of the lasing media enhanced lasing efficiency may be achieved due to efficient use of the flashlamp spectrum accompanied by fluorescent pumping of outer media by inner media or vice versa so that pumping of each medium is substantially more uniform than hitherto. When the lasing media are ordered from radially outermost to radially innermost with successively increasing lasing wavelengths and absorption spectra enhanced lifetimes of the lasing media can be achieved since the radially outermost media spectrally filter the flashlamp spectrum and reduce or eliminate short wavelength radiation from incidence upon media which lase at relatively long wavelengths. Degradation of such media is thereby impeded.

It will be understood that liquid lasing media are known per se and are generally referred to as lasing dyes. The lasing properties of lasing dyes are tabulated in many published documents. By suitable choices of liquids the flow of liquid entering and leaving the tubes can be made optically transparent to the lasing action occurring in outer cells.

Embodiments of the present invention will now be described by way of example with reference to the accompanying drawings in which:

FIG. 1 schematically illustrates a laser according to the present invention and having two lasing media;

FIG. 5 illustrates absorption and fluorescence spectra for lasing media used in the FIG. 4 enclosure;

FIG. 6 illustrates a modified version of the FIG. 4 enclosure; and

FIGS. 7A-7D illustrate absorption and fluorescence spectra for the media used in the FIG. 6 enclosure.

Figure 1:
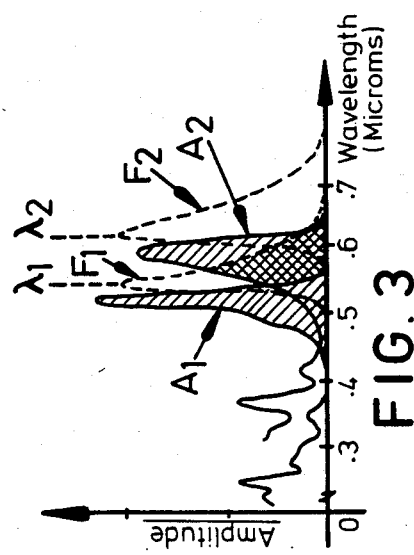

The laser 10 which is shown in FIG. 1 comprises two lasing media respectively capable of lasing at wavelengths $\lambda_1$, $\lambda_2$, and is provided with a mirror 11 which is 100% reflecting at wavelengths $\lambda_1$ and $\lambda_2$ and with a mirror 12, the output mirror, which is partly transmissive at each wavelength $\lambda_1$ and $\lambda_2$. Mirrors 11, 12 together define a laser cavity having an axis 13 and concentric with axis 13 a pump cavity or enclosure 14 is located between mirrors 11, 12. Cavity 14 is formed by a reflector 16 (in this instance the reflector is cylindrical) inside which is a ring of flashlamps 17, each flashlamp 17 extending axially. Within the flashlamp ring there is a structure 20 for housing the lasing media of the laser 10, this structure 20 being shown in greater detail in FIG. 2. Reflector 16 may be of the specular or diffuse type.

Figure 2:
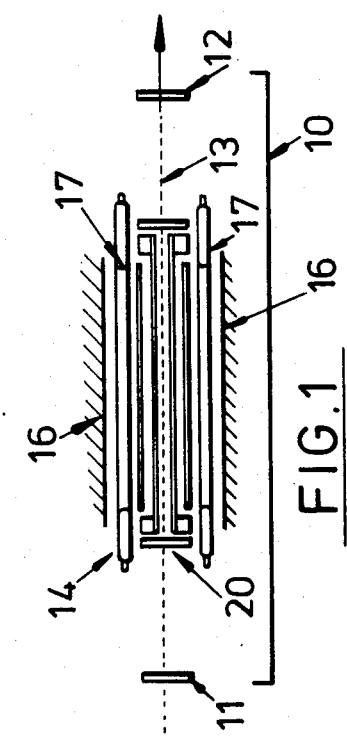
FIG. 2 illustrates part of the pump enclosure of the FIG. 1 laser in greater detail.

The structure 20, as shown in FIG. 2, is formed by a plurality (in this instance two in number) of substantially concentric tubes 21A, 21B, each terminated at its ends by windows 22A, 22'A and 22B, 22'B, the windows 22A, 22'A, of the innermost tube 21A being radially extended to the same diameter as the outermost tube 21B. Accordingly tube 21A is axially longer than tube 21B by approximately the thickness of the windows 22B and 22'B. Also, windows 22B and 22'B are annular. Each window 22A, 22'A and 22B, 22'B is transmissive to lasing radiation at the wavelengths $\lambda_1$ and $\lambda_2$. Furthermore for the purpose of flowing liquid lasing media into and out of the respective tubes 21A, 21B each tube is provided adjacent its end windows with an annular cavity 23A, 23'A, 23B, 23'B, radially externally of the adjoining windows and ports 24A, 24'A and 24B, 24'B are provided in communication with respective cavities.

Figure 3:
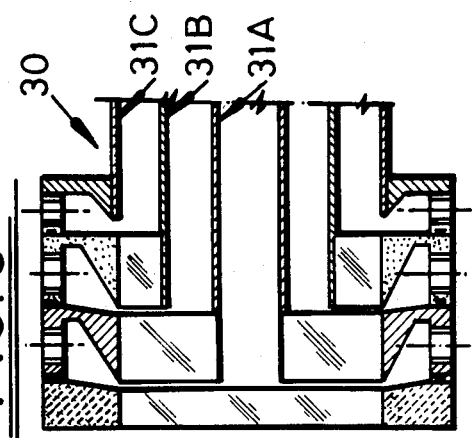
FIG. 3 illustrates absorption and fluorescence spectra for preferred lasing media used in the FIG. 1 laser.

The lasing media which are provided to tubes 21A, 21B are preferentially arranged so that tube 21A houses a liquid medium lasing at wavelength $\lambda_1$ and tube 21B houses a liquid medium lasing at wavelength $\lambda_2$ where $\lambda_1 < \lambda_2$ and additionally the fluorescence spectra of the medium in tube 21A overlaps the absorption spectra of the medium in tube 21B so that, in operation, the radially inner medium optically pumps the outer medium in addition to the optical pumping provided by the flashlamps 17. Enhanced pumping efficiency is thereby achieved. FIG. 3 illustrates the pertaining fluorescence and absorption spectra for two appropriate lasing media namely Rhodamine 6G in Ethanol and Kresyl Violet in Ethanol. For Rhodamine 6G in Ethanol the fluorescence spectra is curve $F_1$ (having a peak value at wavelength $\lambda_1$) and the absorption spectra is curve $A_1$. For Kresyl Violet in Ethanol the fluorescence spectra is curve $F_2$ (having a peak value at wavelength $\lambda_2$) and the absorption spectra is curve $A_2$. It will be seen from FIG. 3 that the medium housed in inner tube 21A absorbs (from the pumping means 17) in the region 0.46 $\mu$m to 0.55 $\mu$m and fluoresces in the region 0.51 $\mu$m to about 0.68 $\mu$m having a peak fluorescence at 0.55 $\mu$m (i.e. $\lambda_1$) whereas the medium housed in outer tube 21B absorbs in the region 0.48 $\mu$m to 0.64 $\mu$m and fluoresces in the region 0.60 $\mu$m to 0.78 $\mu$m having a peak fluorescence at 0.63 $\mu$m (i.e. $\lambda_2$). It will therefore be seen that there is an overlap of the fluorescence spectra of the $\lambda_1$ medium with the absorption spectra of the $\lambda_2$ medium so that the $\lambda_2$ medium, housed in tube 21B is pumped both by the flashlamps 17 and by the $\lambda_1$ medium housed in inner tube 21A. The $\lambda_2$ medium at its lasing wavelength of $\lambda_2$ is not absorbed by the thin sheet of the $\lambda_1$ medium flowing between the windows because the absorption spectrum $A_1$ lies at substantially lower wavelengths i.e., the $\lambda_1$ medium is optically transparent to $\lambda_2$ medium fluorescence.

Figure 4:
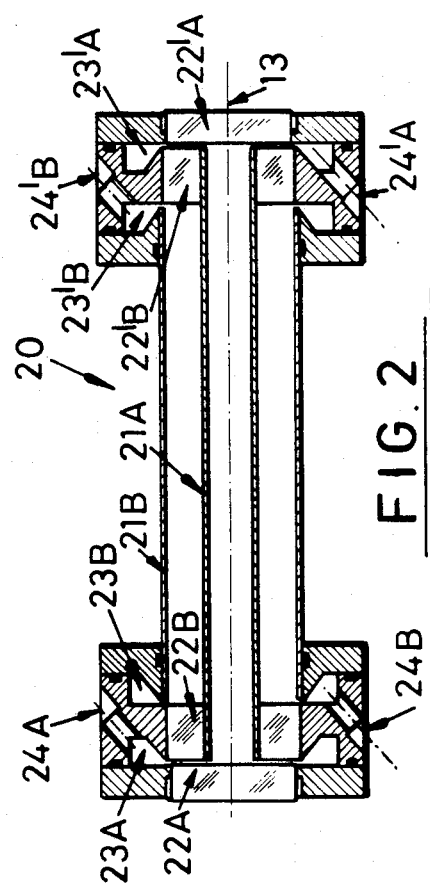
FIG. 4 illustrates a detail of a modified pump enclosure suited to three lasing media.

FIG. 4 illustrates a detail of a structure 30 suited to three liquid lasing media, having concentric tubes 31A, 31B, 31C with respective end windows, annular cavities and ports and which would be used in place of the structure 20 of FIG. 2.

Typical lasing media for the structure 30 are Coumarin 102 in a solvent of 70% water and 30% ethyl alcohol; Rhodamine 6G in 70% water and 30% ethyl alcohol; and Kresyl Violet in 70% water and 30% ethyl alcohol in respective tubes 31C, 31B and 31A. FIG. 5 illustrates the respective fluorescence and absorption spectra for these media. For Coumarin 102 in tube 31C the fluorescence spectra is curve $F_5$ and the absorption spectra is curve $A_5$; for Rhodamine 6G in tube 31B the fluorescence spectra is curve $F_6$ and the absorption spectra is curve $A_6$; and for Kersyl Violet in tube 31A the fluorescence spectra is curve $F_7$ and the absorption spectra is curve $A_7$.

FIG. 6 illustrates a detail of a structure 40 suited to four fluorescent media of which the outermost medium is a non-lasing fluorescence converter whilst the remaining three media are lasing. In FIG. 6 the innermost tube is 41A and contains a lasing medium, as do concentric tubes 41B and 41C. The outermost tube is 41D which contains the fluorescence converter. The general arrangement of structure 40 is the same as structure 20. Typically the fluorescence and absorption spectra of the four media are as schematically illustrated in FIG. 7 so that each lasing medium utilises a separate spectral region of the flashlamp spectrum and additionally is pumped by the fluorescence from the adjacent radially outer medium with the result that the radially innermost medium is subjected to a relatively narrow spread of the flashlamp spectrum which thereby enhances the life of the innermost medium. In FIG. 7 the absorption (A) and fluorescence (F) spectra for each media is shown separately in the interests of clarity so that the curves of FIG. 7A represent the spectra of the fluorescent converter FIG. 7B curves represent the spectra of the outermost lasing medium, FIG. 7C curves represent the spectra of the second innermost lasing medium, and FIG. 7D curves represent the spectra of the innermost or central lasing medium. Although during lasing operation there will be a degree of absorption of the lasing output of the two outermost media in traversing the spaces between the windows of the structure through which other media flow, this absorption can be confined to an insignificant level by rendering the size of these spaces small so that the bulk of lasing medium therein is small.

What is claimed is:

1. A multiple wavelength operating laser comprising a laser cavity including a pump enclosure surrounded by optical pumping means wherein the pump enclosure comprises a plurality of substantially concentric tubes extending axially within the laser cavity, each tube containing a respective liquid lasing medium, the ends of each tube including a window for transmitting laser wavelengths, and the walls of each tube being transmissive to wavelengths emanating from the optical pumping means.

2. A laser as claimed in claim 1, wherein the ends of each tube further include passage means for enabling flow of the liquid lasing media into and out of the respective tubes.

3. A laser as claimed in claim 1, wherein the lasing media, from radially outermost to radially innermost, are ordered with successively decreasing lasing wavelengths and with successively decreasing absorption spectra.

4. A laser as claimed in claim 3, wherein the fluorescence emission of a radially inner lasing medium overlaps the absorption spectrum of the adjoining radially outer lasing medium.

5. A laser as claimed in claim 1, wherein the lasing media, from radially outermost to radially innermost, are ordered with successively increasing lasing wavelengths and with successively increasing absorption spectra.

6. A laser as claimed in claim 5, wherein the fluorescence emission of a radially outer lasing medium overlaps the absorption spectrum of the adjoining radially inner lasing medium.

7. A laser as claimed in claim 1, wherein a fluorescence converter is disposed between the optical pumping means and the radially outermost tube.

8. A laser as claimed in claim 1, wherein the lasing media are continuously flowed through the tubes by separate circulation systems.

* * * * *